US011810300B2

(12) United States Patent
Wang et al.

(10) Patent No.: US 11,810,300 B2
(45) Date of Patent: Nov. 7, 2023

(54) METHOD FOR DETECTING IMAGE OF ESOPHAGEAL CANCER USING HYPERSPECTRAL IMAGING

(71) Applicant: NATIONAL CHUNG CHENG UNIVERSITY, Chiayi County (TW)

(72) Inventors: Hsiang-Chen Wang, Chiayi (TW); Tsung-Yu Yang, Chiayi County (TW); Yu-Sheng Chi, Chiayi County (TW); Ting-Chun Men, Chiayi County (TW)

(73) Assignee: National Chung Cheng University, Chiayi County (TW)

( * ) Notice: Subject to any disclaimer, the term of this patent is extended or adjusted under 35 U.S.C. 154(b) by 29 days.

(21) Appl. No.: 17/394,724

(22) Filed: Aug. 5, 2021

(65) Prior Publication Data

US 2023/0015055 A1 Jan. 19, 2023

(30) Foreign Application Priority Data

Jul. 16, 2021 (TW) .................................. 110126333

(51) Int. Cl.
*G06T 3/40* (2006.01)
*G06T 7/00* (2017.01)
(Continued)

(52) U.S. Cl.
CPC .............. *G06T 7/0014* (2013.01); *G06T 3/40* (2013.01); *G06V 10/754* (2022.01); *G06V 10/76* (2022.01);
(Continued)

(58) Field of Classification Search
None
See application file for complete search history.

(56) References Cited

U.S. PATENT DOCUMENTS

2016/0187199 A1* 6/2016 Brunk ................... G01J 3/0208
348/89
2021/0307860 A1* 10/2021 Mak ..................... A61B 1/0655

OTHER PUBLICATIONS

Shu et al., "Hyperspectral Image Classification With Stacking Spectral Patches and Convolutional Neural Networks," IEEE Transactions on Geoscience and Remote Sensing, vol. 56, No. 10, Oct. 2018 (Year: 2018).*

(Continued)

*Primary Examiner* — Soo Shin
(74) *Attorney, Agent, or Firm* — Rosenberg, Klein & Lee

(57) ABSTRACT

This application provides a method for detecting images of testing object using hyperspectral imaging. Firstly, obtaining a hyperspectral imaging information according to a reference image, hereby, obtaining corresponded hyperspectral image from an input image and obtaining corresponded feature values for operating Principal components analysis to simplify feature values. Then, obtaining feature images by Convolution kernel, and then positioning an image of an object under detected by a default box and a boundary box from the feature image. By Comparing with the esophageal cancer sample image, the image of the object under detected is classifying to an esophageal cancer image or a non-esophageal cancer image. Thus, detecting an input image from the image capturing device by the convolutional neural network to judge if the input image is the esophageal cancer image for helping the doctor to interpret the image of the object under detected.

10 Claims, 13 Drawing Sheets

(51) Int. Cl.
 *G06T 7/73* (2017.01)
 *G06V 10/75* (2022.01)
 *G06V 10/82* (2022.01)
 *G06V 30/146* (2022.01)

(52) U.S. Cl.
 CPC .............. *G06T 2207/10036* (2013.01); *G06T 2207/30096* (2013.01)

(56) References Cited

OTHER PUBLICATIONS

Zhang et al., Multispectral Heterogeneity Detection Based on Frame Accumulation and Deep Learning, IEEE Access vol. 7, Mar. 5, 2019 (Year: 2019).*

Haque et al., "Spectral-Spatial Feature Extraction Using PCA and Multi-Scale Deep Convolutional Neural Network for Hyperspectral Image Classification," 2019 22nd International Conference on Computer and Information Technology (ICCIT), Dec. 18-20, 2019 (Year: 2019).*

Wu et al., "Hyperspectral image target detection via integrated background suppression with adaptive weight selection," Neurocomputing 315 (2018) 59-67 (Year: 2018).*

* cited by examiner

METHOD FOR DETECTING IMAGE OF ESOPHAGEAL CANCER USING HYPERSPECTRAL IMAGING

FIELD OF THE INVENTION

This invention discloses an image processing method, in particular a method of detecting images of testing object using hyperspectral imaging.

BACKGROUND OF THE INVENTION

The esophagus is a tubular organ connecting the pharynx and the stomach [2], which is mainly responsible for transporting food swallowed by the mouth to the stomach. The normal esophageal mucosa has multiple layers of squamous epithelial cells with a thickness of about 200 to 500 μm. From the surface down, it can be divided into the following layers: the mucosal epithelial layer (EP), lamina propria mucosae (LPM), muscular mucosa (MM), submucosa (SM), and muscular propria (MP). Esophageal cancer is the 8$^{th}$ most common cancer type in the world, and malignant tumors derived from epithelial tissue are called cancers. Besides, malignant cancers (also is known as malignant tumors) generally affect physiological functions, which include sarcoma, lymphoma, leukemia, melanoma, carcinosarcoma, and malignant glioma.

Among them, malignant tumors that occur in connective tissue are called the sarcomas, and the connective tissue includes the fibrous tissue, adipose (fat) tissue, muscle, blood vessel, bone, and cartilage. Lymphoma and leukemia occur in hematopoietic tissues. Melanoma occurs in skin cells. A malignant tumor that occurs in both epithelial and connective tissues is called the carcinosarcomas. The malignant glioma is a malignant tumor that occurs in nerve tissue. The malignant tumor of esophageal cancer not only infiltrates the epithelial tissue on the esophagus, but also the connective tissue in the later stage.

Current disease diagnosis technologies usually rely on a single macroscopic data and information, such as the body temperature, blood pressure, or body scan images. For instance, to detect major diseases such as cancer, most of the instruments commonly used currently are based on imaging technology, including X-ray, CT scan, and nuclear magnetic resonance (NMR) imaging technology. When these diagnostic devices are used in combination, they are useful with varying degrees in the diagnosis of diseases. However, when these devices are used alone, they cannot perform accurate, credible, efficient, and economical detection in the early stage of major diseases. In addition, many of these existing devices are large and invasive, such as X-ray, CT scan, or nuclear magnetic resonance (NMR) imaging technology. Therefore, endoscopy was developed to check whether or not there are lesions on the digestive organs.

Early esophageal cancer is not easy to diagnose. Except almost no symptom is show s in the early stage, even if taking the diagnosis of esophageal endoscopy, some early esophageal cancers will not be visible because the change in the lesion is very subtle and often only has a slight color change. Thus, if a traditional endoscope is used for detection, a large number of early esophageal cancer lesions will be ignored and thus would delay the necessary treatment. Therefore, Lugol chromoendoscopy, Narrow Band Image (NBI), and Magnifying Endoscopy have been developed for lesions that are not easily detectable.

Yet, the operation of the endoscope is very complicated; to carry out the endoscope inspection, the medical staff needs to have professional licenses on the endoscope. It is also necessary for the medical staff to operate the endoscope and distinguish the lesions at the same time. Although the inspection method of the endoscope has been improved in many ways, it is still inevitable on the negligence of manual operation, or the endoscopic image is still not easy to recognize therewith.

Due to the aforesaid issues, this invention provides a method for detecting the images of testing object using hyperspectral imaging. The host performs a convolution operation, inputting an image to the operation of the convolutional neural network to obtain the characteristic image, then, calculating to derive the testing object image. It further compares the sample image through the testing object image and categorizes the testing object image as a target testing object image or a non-target testing object image, avoiding the difficulty of manual image recognition.

SUMMARY

The major purpose of this invention is to provide a method for detecting images of testing object using hyperspectral imaging. It performs the convolutional neural network operation to obtain the characteristic image and derive the testing object image. It further compares the sample image through the testing object image and categorizes the testing object image as a target testing object image or a non-target testing object image.

To achieve the above purpose, this invention discloses a method for detecting a testing object image using hyperspectral imaging. First, a host obtains hyperspectral image information according to a reference image, and an image capture unit provides an inputted image to a host. The inputted image includes at least a testing object image and a background image; then, the host converts the inputted image according to the hyperspectral image information to obtain a hyperspectral image; and then the host analyzes the hyperspectral image to obtain a plurality of first hyperspectral eigenvalues. Then, the host performs a principal component analyzing operation on the first hyperspectral eigenvalues to generate the corresponding plural second eigenvalues, Next, the host follows a plurality of convolution cores to perform at least a layer of convolution operation on the second eigenvalues to obtain a convolution result and obtains at least a selected image according to the convolution result and at least a testing object image. The convolution cores include a plurality of selected eigenvalues and a plurality of peripheral eigenvalues, the at least a testing object image includes a plurality of peripheral images and at least a selected image; the peripheral images surround the at least one selected image, and the at least a selected image corresponds to the selected eigenvalues. The peripheral images correspond to the peripheral eigenvalues. Next, the host generates at least a pre-set frame according to the edge of at least a selected image and captures a boundary frame of the inputted image, so that the host compares a second center point of a boundary frame on the inputted image according to a first center point of the pre-set frame to obtain a center offset of the pre-set frame and the boundary frame, which makes the host performing a regression operation according to the center offset to align the testing object image in the pre-set frame, making the pre-set frame superimposed with the center of the boundary frame, and the selected image moves toward the center of the boundary frame. Finally, the host compares the testing object image with at least a sample image to generate a comparison result and categorizes the inputted image as an image of the target object or a non-target object. In this way, for the image of the target object, this invention can use the host's convolution calculation to perform the characteristic detection on it and compares the testing object image selected by the pre-set frame with the sample image to categorize the inputted image into a target image or a non-target object. Therefore, it can automatically recognize the target image and prevent the unrecognizable problem.

This invention provides an embodiment, in which in the step of comparing the second eigenvalue with a plurality of convolution cores by the host, the host sets the convolution cores to m×n×p matrix and normalizes the plural pixel values of the inputted image to the normal pixel values, multiplies the normal pixel values by the convolution cores, and captures the second eigenvalues in a convolutional layer; where m=n, m is 1, 3, 5, 10, 19, or 38.

This invention provides an embodiment, in which in the step of obtaining at least a selected image according to the convolution result and the at least a testing object image, the host integrates the areas where the selected eigenvalues are located, and obtains at least a distribution area on the inputted image; and it uses the at least a distribution area to build the pre-set frame.

This invention provides an embodiment, in which in the step of converting the inputted image into a plurality of eigenvalues by the host and detecting the eigenvalues by using a plurality of convolution cores, the host follows a single multi-frame target detector model to perform convolution on each pixel of the inputted image and detect the second eigenvalues.

This invention provides an embodiment, in which in the step of the host performing a regression operation according to the center offset, the host uses a first position of the pre-set frame, a second position of the boundary frame, and a zooming factor to perform the regression operation and position the testing object image.

This invention provides an embodiment, in which in the step that the host compares the testing object image with at least a sample image, the host performs categorization and comparison of the testing object image and the at least a same image on a fully connected layer.

This invention provides an embodiment, in which in the step of categorizing the inputted image as a target object image or anon-target object image according to a comparison result, when the host fails to recognize the testing object image in the pre-set frame that matches the at least a sample image, the host categorizes the inputted image into a non-target object image; otherwise, the host categorizes the inputted image into a target object image.

This invention provides an embodiment, in which in the step of categorizing the inputted image as a target object image or a non-target object image according to a comparison result. When the host categorizes the inputted image into the non-target object image, the host compares at least a sample image with the testing object image for the second time. When the host judges that the similarity of the images of testing object is greater than a similarity threshold, the host categorizes the inputted image to the target object image, otherwise, the host categorizes the inputted image to the non-target object image.

This invention provides an embodiment, in which the hyperspectral image information corresponds to a plurality of white light images and a plurality of narrowband images, which include a plurality of color matching functions, a correction matrix, and a conversion matrix.

DETAILED DESCRIPTION

To enable the Review Committee members to have a deeper realization and understanding of the features and functions of this invention, we hereby put the embodiment and detailed explanation in below:

Due to the fact of the negligence of manual operation or the difficulty of image recognition caused by the complicated operation of the conventional endoscope, this invention proposes a method in detecting object image with a hyperspectral image in the perspective of solving the problem of the negligence of manual operation or the image is not easy to recognize about in the conventional endoscope technology.

Figure 1:
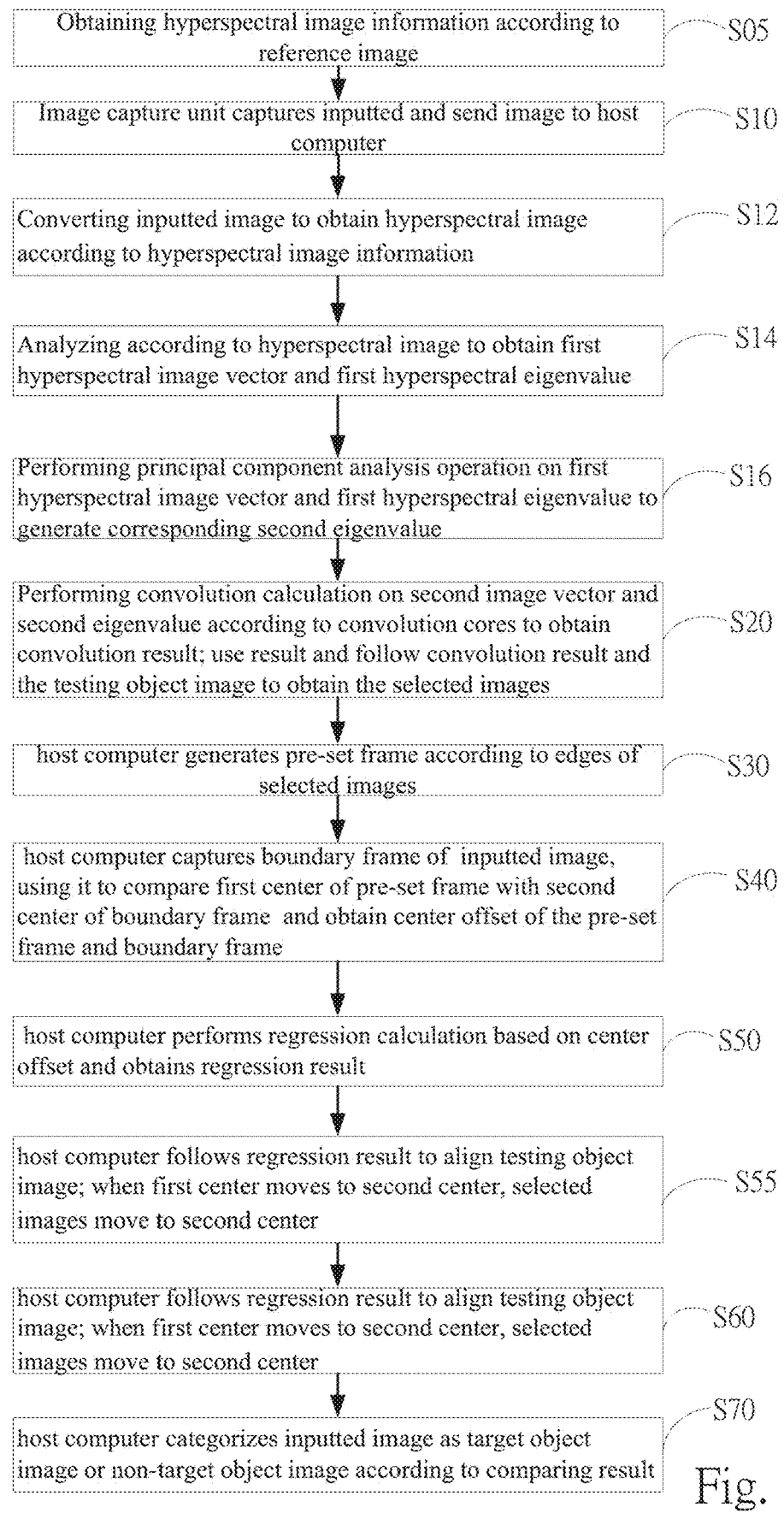
FIG. 1: which is illustrated a flowchart of convolution detecting image in an embodiment of this invention.

In the following statements we will further explain the features provided by the method for detecting object images using hyperspectral imaging and the system with which this invention has disclosed:

First, refer to FIG. 1, which is a flowchart of a turn-based game according to an embodiment of this invention. As shown in FIG. 1, the steps of the method for detecting an object image with a hyperspectral image disclosed in this invention include:

Step S05: Obtaining the hyperspectral image information according to the reference image;

Step S10: The image capture unit captures the inputted image and send it to the host;

Step S12: Converting the inputted image to obtain a hyperspectral image according to the hyperspectral image information;

Step S14: Analyzing according to the hyperspectral image to obtain the first hyperspectral image vector and the first hyperspectral eigenvalue;

Step S16: Performing a principal component analysis operation on the first hyperspectral image vector and the first hyperspectral eigenvalue to generate the second image vector and the corresponding second eigenvalue;

Step S20: Performing convolution calculation on the second image vector and the second eigenvalue according to the convolution cores to obtain a convolution result; use the result and follow the convolution result and the testing object image to obtain the selected images;

Step S30: The host generates a pre-set frame according to the edges of the selected images; and Step S40: The host captures the boundary frame of the inputted image, using it to compare the first center of the pre-set frame with the second center of the boundary frame and obtain the center offset of the pre-set frame and the boundary frame;

Step S50: The host performs a regression calculation based on the center offset and obtains the regression result;

Step S55: The host follows the regression result to align the testing object image; when the first center moves to the second center, the selected images move to the second center;

Step S60: The host compares the testing object image with the sample image and generates a comparing result; and Step S70: The host categorizes the inputted image as a target object image or a non-target object image according to the comparing result.

Please refer to FIG. 2A to 2H, which are the detection system 1 used in the method for detecting object images by hyperspectral image specified in this invention, which includes a host 10 and an image capture unit 20. In this embodiment, as an example, a host 10 is equipped with a processing unit 12, a memory 14, and a storage unit 16. Yet, it isn't limited to this only; the host can be a server, a laptop, a tablet, or computing power-based electronic devices. Database 30 is built in a storage unit 16. Yet, it isn't limited to this only; it can also be an external storage unit of host 10. The host 10 uses the processing unit 12 to run a convolution program P and creates a convolutional neural network CNN. Moreover, the image capture unit 20 is an endoscope in this embodiment; which is used to inspect internal organs and tissues, such as the cystoscope, gastroscope, colonoscope, bronchoscope, and laparoscope.

Figure 2A:
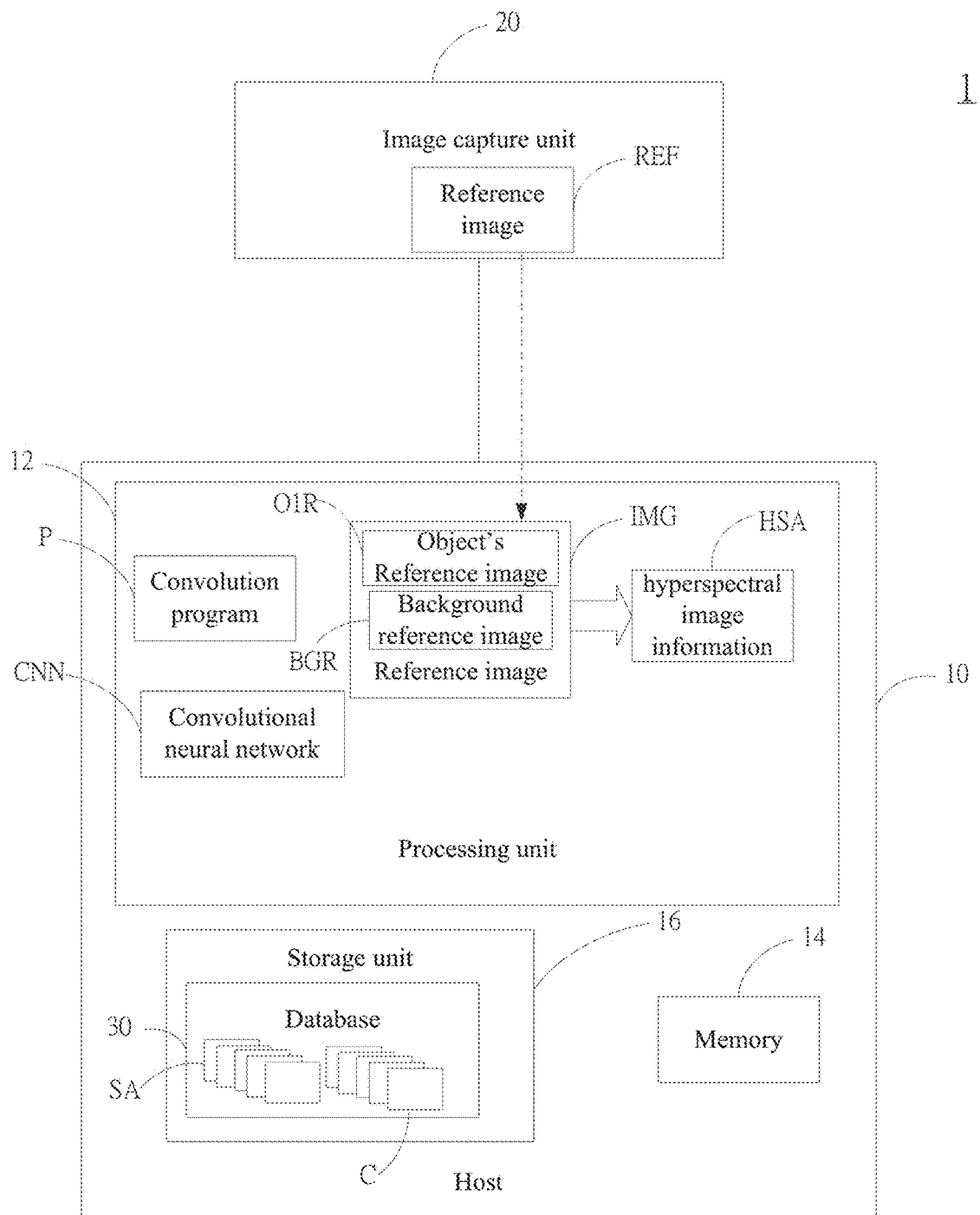
FIG. 2A to 2H: which is illustrated schematic diagrams of partial steps in an embodiment of this invention.

In step S05, as shown in FIG. 2A, the host 10 reads a reference image REF corresponding to the image capture unit 20; the inputted image REF includes at least a testing object image O1 and a background image BG, where the inputted image REF can be a white light image and a narrowband image stored in the database 30, or a reference color block captured in the 24 color checkers by the image capture unit 20. The image capture unit 20 specified in this embodiment uses the white light endoscope OLYMPUS EVIS LUCERA CV-260 SL to obtain the corresponding white light reference image, and uses the narrowband endoscope OLYMPUS EVIS LUCERA CLV-260 to obtain the corresponding narrowband reference image; which is, at least an object reference image O1R and a background reference image BGR exist in the white light reference image and the narrowband reference image of the reference image REF respectively.

Refer to FIG. 2A, the host 10 obtains a hyperspectral image information HSA according to the reference image REF, that is, using the Visible Hyperspectral Algorithm (VIS-HSA) to run the inputted image captured by the image capture unit 20 and obtain the converting equation that converts the ordinary image color space (that is, the color space of the captured image) to the XYZ color space (1931XYZ Color space) (for example, the conversion from sRGB color space to XYZ color space). The hyperspectral image information of this invention corresponds to the hyperspectral image of the visible light waveband in the visible light hyperspectral image technology; and it corresponds to the 24 color checkers (X-Rite Classic, 24 Color Checkers); the 24 color checkers contain the main colors commonly found in nature (red, green, blue and gray). The hyperspectral image information HSA corresponds to the plurality of white light images and narrowband images and includes a plurality of color matching functions (CMF), a correction matrix C, and a conversion matrix M.

Continuing the above, the first step of conversion should convert the reference image REF and the spectrometer to the same XYZ color space; the conversion equation of the reference image REF is as follows:

$$\begin{bmatrix} X \\ Y \\ Z \end{bmatrix} = [M_A][T] \begin{bmatrix} f(R_{SRGB}) \\ f(G_{SRGB}) \\ f(B_{SRGB}) \end{bmatrix} \times 100, 0 \leq \begin{matrix} R_{SRGB} \\ G_{SRGB} \\ B_{SRGB} \end{matrix} \leq 1 \quad \text{Equation (1)}$$

Where $$[T] = \begin{bmatrix} 0.4104 & 0.3576 & 0.1805 \\ 0.2126 & 0.7152 & 0.0722 \\ 0.0193 & 0.1192 & 0.9505 \end{bmatrix} \quad \text{Equation (2)}$$

$$f(n) = \begin{cases} \left(\dfrac{n+0.055}{1.055}\right), & n > 0.04045 \\ \left(\dfrac{n}{12.92}\right), & \text{otherwise} \end{cases} \quad \text{Equation (3)}$$

$$[M_A] = \begin{bmatrix} X_{SW}/X_{CW} & 0 & 0 \\ 0 & Y_{SW}/X_{CW} & 0 \\ 0 & 0 & Z_{SW}/Z_{CW} \end{bmatrix} \quad \text{Equation (4)}$$

$f(n)$ is a gamma function, T is the conversion matrix, and $[M_A]$ is the color adaptation matrix.

The equation for converting the reflection spectrum data captured by the spectrometer to the XYZ color gamut space is as follows:

$$X = k \int_{380nm}^{780nm} S(\lambda) R(\lambda) \bar{x}(\lambda) d\lambda \quad \text{Equation (5)}$$

$$Y = k \int_{380nm}^{780nm} S(\lambda) R(\lambda) \bar{y}(\lambda) d\lambda \quad \text{Equation (6)}$$

$$Z = k \int_{380nm}^{780nm} S(\lambda) R(\lambda) \bar{z}(\lambda) d\lambda \quad \text{Equation (7)}$$

Where k is shown in below    Equation (8):

$$k = 100 \int_{380nm}^{780nm} S(\lambda) \bar{y}(\lambda) d\lambda \quad \text{Equation (9)}$$

$\bar{x}(\lambda)$, $\bar{y}(\lambda)$, $\bar{z}(\lambda)$ are the color matching functions, $S(\lambda)$ is the spectrum of light source taken by the endoscope. Since the Y value of the XYZ color space is proportional to the brightness, use Equation (9) to obtain the maximum brightness Y of the light source spectrum; then, specify the upper limit of Y to be 100 and obtain the normative ratio k of brightness. Therefore, use equations (5) to (7) to obtain the XYZ value $[XYZ_{Spectrum}]$.

In addition, the endoscope image can be further corrected through the correction matrix C of Equation (10):

$$[C] = [XYZ_{Spectrum}] \times nv([V]) \quad \text{Equation (10)}$$

The variable matrix [V] is obtained by analyzing the factors that may cause errors in the endoscope. The factors that cause the errors are the nonlinear response of the endoscope, the dark current of the endoscope, the inaccurate color separation of the color filter, and the color shift (for example, white balance), used to correct the XYZ value $[XYZ_{Spectrum}]$.

Since the calculation results of the narrowband image and the white light image in the third-order operation are similar, the nonlinear response correction is performed by the third-order equation, and the nonlinear response of the endoscope is corrected by Equation (11):

$$V_{Non\text{-}linear} = [X^3 \ Y^3 \ Z^3 \ X^2 \ Y^2 \ Z^2 \ X \ Y \ Z \ 1]^T \quad \text{Equation (11)}$$

Generally speaking, the dark current in the endoscope is a fixed value and won't change significantly with the change of light-in amount; the effect of dark current is regarded as a constant, and the correction variable of dark current is defined as VDark; use Equation (12) to correct the influence of dark current:

$$V_{Dark}=[\alpha] \qquad \text{Equation (12)}$$

The correction variable for the inaccuracy of color separation and color shift of the filter is defined as $V_{Color}$, $\tilde{x}(\lambda)$, $\tilde{y}(\lambda)$, $\tilde{z}(\lambda)$ are the color matching functions from RGB color space to XYZ color space, Therefore, according to the correlation between $\tilde{x}(\lambda)$, $\tilde{y}(\lambda)$, $\tilde{z}(\lambda)$, the possible permutations between X, Y, and Z are listed in the following Equation (13), used to correct the inaccurate color separation and color shift of the endoscopic image in the color filter:

$$V_{Color}=[XYZ\ XY\ YZ\ XZ\ X\ Y\ Z]^T \qquad \text{Equation (13)}$$

From the above Equation (11) to Equation (13), the correction variable matrix V shown in Equation (14) is derived:

$$V=[X^3Y^3Z^3\ X^2Y\ X^2Z\ Y^2Z\ XZ^2\ YZ^2\ XYZX^2Y^2\ Z^2\ XY\ YZ\ XZ\ X\ Y\ Z\alpha]^T \qquad \text{Equation (14)}$$

By combining the above variable matrix V with the correction matrix C, the values of corrected X, Y, and Z $[XYZ_{Correct}]$ are obtained, as shown in Equation (15) below:

$$[XYZ_{Correct}]=[C]\times[V] \qquad \text{Equation (15)}$$

The average error of the white light image between $[XYZ_{Correct}]$ and $[XYZ_{Spectrum}]$ is 1.40, and the average error of the narrow hand image between $[XYZ_{Correct}]$ and $[XYZ_{Spectrum}]$ is 2.39.

Since the above calculation uses the visible light wavelength range of 380 nm to 780 nm, the correction result of endoscope must be expressed in color difference, where $[XYZ_{Correct}]$ and $[XYZ_{Spectrum}]$ are converted to Lab color space corresponding to CIE DE2000. The color space conversion equations are shown in Equation (16) to Equation (18):

$$L^* = 116 f\left(\frac{Y}{Y_n}\right) - 16 \qquad \text{Equation (16)}$$

$$a^* = 500\left[f\left(\frac{X}{X_n}\right) - f\left(\frac{Y}{Y_n}\right)\right] \qquad \text{Equation (17)}$$

$$b^* = 200\left[f\left(\frac{Y}{Y_n}\right) - f\left(\frac{Z}{Z_n}\right)\right] \qquad \text{Equation (18)}$$

Where $f(n)$ is shown in Equation (19) below:

$$f(n) = \begin{cases} n^{\frac{1}{3}}, & n > 0.008856 \\ 7.787n + 0.137931, & \text{otherwise} \end{cases} \qquad \text{Equation (19)}$$

The average chromatic aberration of the white light image before correction is 11.4, the average chromatic aberration after correction is 2.84, and the average chromatic aberration of the narrowband image before correction is 29.14, the average chromatic aberration after correction is 2.58.

Figure 2B:
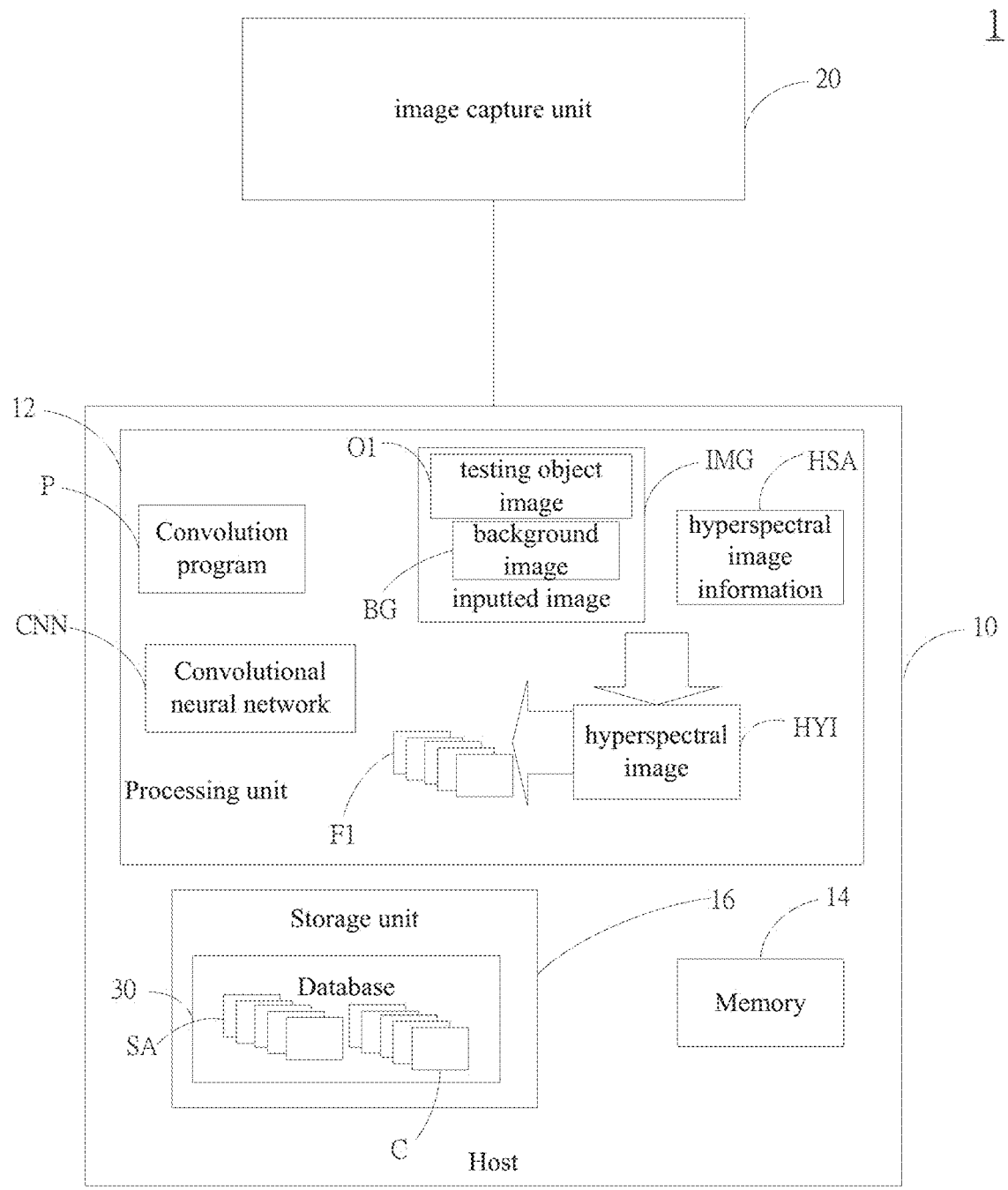

In step S10, as shown in FIG. 2B, the host 10 obtains an inputted image IMG from the image capture unit 20, where the inputted image IMG can have a white light image and a narrowband image like the reference image REF. The image capture unit 20 in this embodiment is a white light endoscope OLYMPUS EVIS LUCERA CV-260 SL corresponding to the white light image, and a narrowband endoscope OLYMPUS EVIS LUCERA CLV-260 corresponds to the narrowband image. In step S12, the host 10 follows the resolution of the inputted image IMG meeting a resolution threshold, for example, 10 nanometers. It is judged that the inputted image IMG meets the resolution threshold of the hyperspectral image, therefore, according to the hyperspectral image information HSA obtained in step S05, the inputted image IMG is converted to the hyperspectral image HYI, and continue to run step S14.

Following the above, in step S14, the host takes out a plurality of corresponding first hyperspectral eigenvalues F1 according to the hyperspectral image HYI. In step S16, the first hyperspectral eigenvalue F1 obtained by the host 10 in step S14 is used to perform principal component analysis (PCA) calculations. To simplify the calculation result and filter out lower changes, the hyperspectral image HYI is simplified and a plurality of second eigenvalues F2 are generated. The calculation equation of PCA is shown in Equation (20) below:

$$y_i=a_{j1}(x_{1i}-\bar{x}_1)+a_{j2}(x_{2i}-\bar{x}_2)+\ldots+a_{jn} \qquad \text{Equation (20)}$$

$x_{1i}$ to $x_{ni}$ represent the spectral intensities of the first to the $n^{th}$ wavelengths; $\bar{x}_1$ to $\bar{x}_n$ represent the expected spectrums (average spectrum intensities) of the first to the $n^{th}$ wavelengths; $a_{j1}$ to $a_{jn}$ to represent the spectrum eigenvector coefficient of the covariance matrix for covariance calculation. In the perspective of reducing the computational complexity, after the principal component analysis has reduced the dimensionality of the 401-dimensional spectrum information only the first three dimensions are required.

Furthermore, by using the correction value $[XYZ_{Correct}]$ obtained above with the reflection spectrum data corresponding to the above 24 color checker $[R_{Spectrum}]$, the corresponding conversion matrix M is obtained from Equation (21) below:

$$[M]=[Score]\times pinv([V_{Color}]) \qquad \text{Equation (21)}$$

$$[S_{Spectr}]_{380\text{-}780}=[EV][M][V_{Color}] \qquad \text{Equation (22)}$$

Where [Score] is a plurality of principal components (EV) obtained from the reflectance spectrum data $[R_{Spectrum}]$ through the principal component analysis. In this embodiment, we use 12 sets of principal components with a better explanatory ability (the weight percentages are 88.0417%, 8.2212%, 2.6422% 0.609%, 0.22382%, 0.10432%, 0.054658%, 0.0472%, 0.02638%, 0.012184%, 0.010952%, acid 0.0028714%) to make dimensionality reducing operation and thus obtains the simulated spectrum $[S_{Spectrum}]_{380\text{-}780}$, the error between the $[S_{Spectrum}]_{380\text{-}780}$ and the inputted image IMG $[XYZ_{Spectrum}]$ is corrected from 11.6 to 2.85 in a white light image, and from 29.14 to 2.60 in the narrowband image. Thus, the color error that cannot be easily recognized by the naked eye is achieved, and it is convenient for the user to obtain a better color reproduction performance when the user has a color reproduction requirement. Therefore, it has simulated a better hyperspectral image in the visible light band.

Figure 2C:
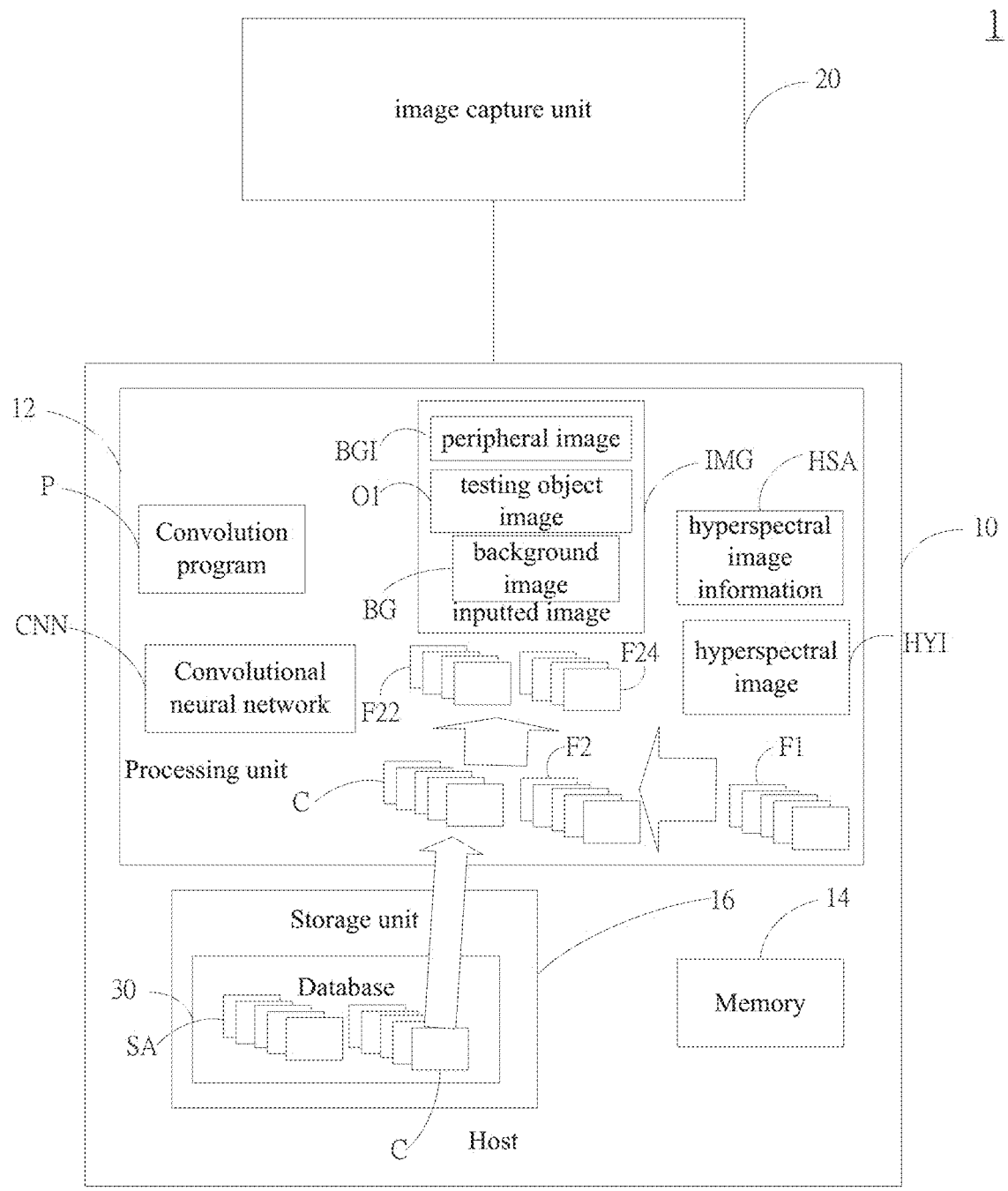
Figure 3:
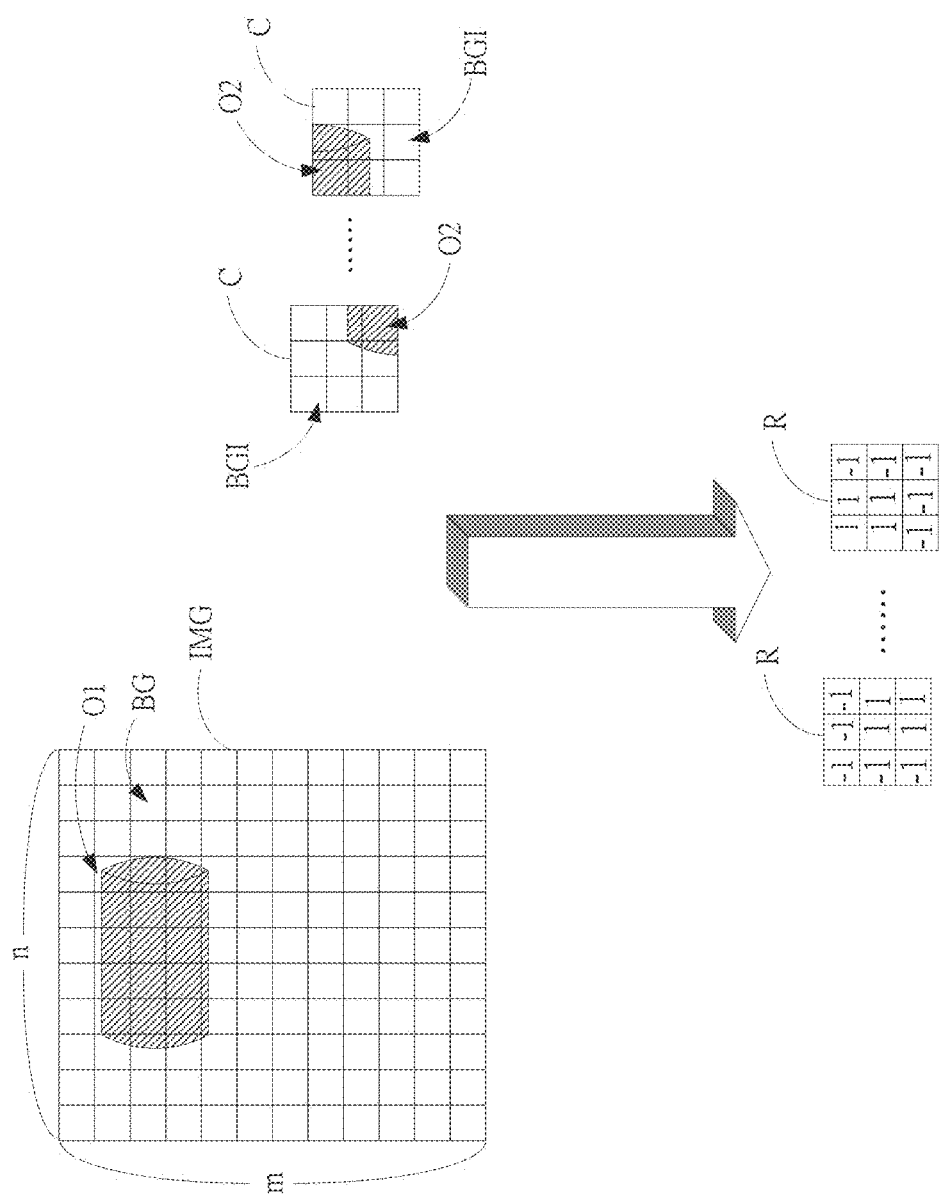
FIG. 3: which is illustrated a schematic diagram of convolution cores and inputted image in an embodiment of this invention.

In step S20, as shown in FIG. 2C and FIG. 3, the host 10 applies the second eigenvalue F2 obtained from the inputted image IMG through steps S14 to S16, in particular the value between 0 and 1, using a plurality of the convolution cores C to detect a plurality of second eigenvalues F2 corresponding to the inputted image "IMG;" the convolution cores C include the selected eigenvalues F22 corresponding to a plurality of selected images O2 of the at least a testing object image O2 and the peripheral eigenvalues F24 corresponding to the peripheral images BGI adjacent to the at least a testing object image O1 used to filter out the background image BG that does not contain the testing object image O1. The host follows a single shot multi-frame target detector model to perform convolution on each pixel unit of the inputted image, detecting the eigenvalues; and the convolution cores C correspond to the selected eigenvalues F22 corresponding to the plural selected images O2 of at least a testing object image O1, and the peripheral eigenvalues F24 corresponds to the peripheral images BGI in the adjacent edge.

Figure 4:
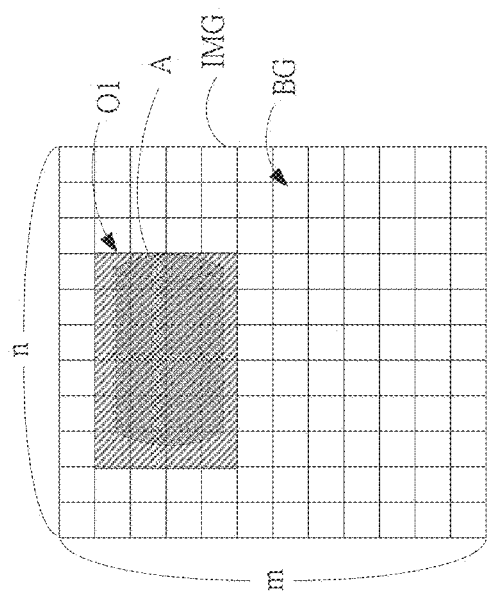
FIG. 4: which is illustrated a schematic diagram of the locating area in an embodiment of this invention.

Refer to FIG. 2C and FIG. 3, the inputted image IMG is in m×n pixel unit, characteristically taken through P channels; therefore, the convolution cores C are m×m×p units, m=n. For example, the 1×1×p, 3×3×p, 5×5×p, 10×10×p, 19×19×p or 38×38×p units. The convolution cores C detect the testing object image O1 on the inputted image IMG and the background image BG to filter out the background image BG, reducing the subsequent processing on the background image BG. The second eigenvalue F2 corresponding to the inputted image IMG is the corresponded selected eigenvalue F22 and the peripheral eigenvalues F24 converted from the processing unit 12. The processing unit 12 multiplies the convolution cores C and the second eigenvalue F2 corresponding to the inputted image IMG and obtains different convolution result R, getting 1 for the identical case and −1 for the different case, and thus filters out the irrelevant background image BG; as shown in FIG. 4, it obtains the entire or partial of the at least a testing object image O1 from the second eigenvalue F2 corresponding to the inputted image IMG, and thus obtaining the entire or partial of the area A where the at least a testing object image O1 is located.

Figure 2D:
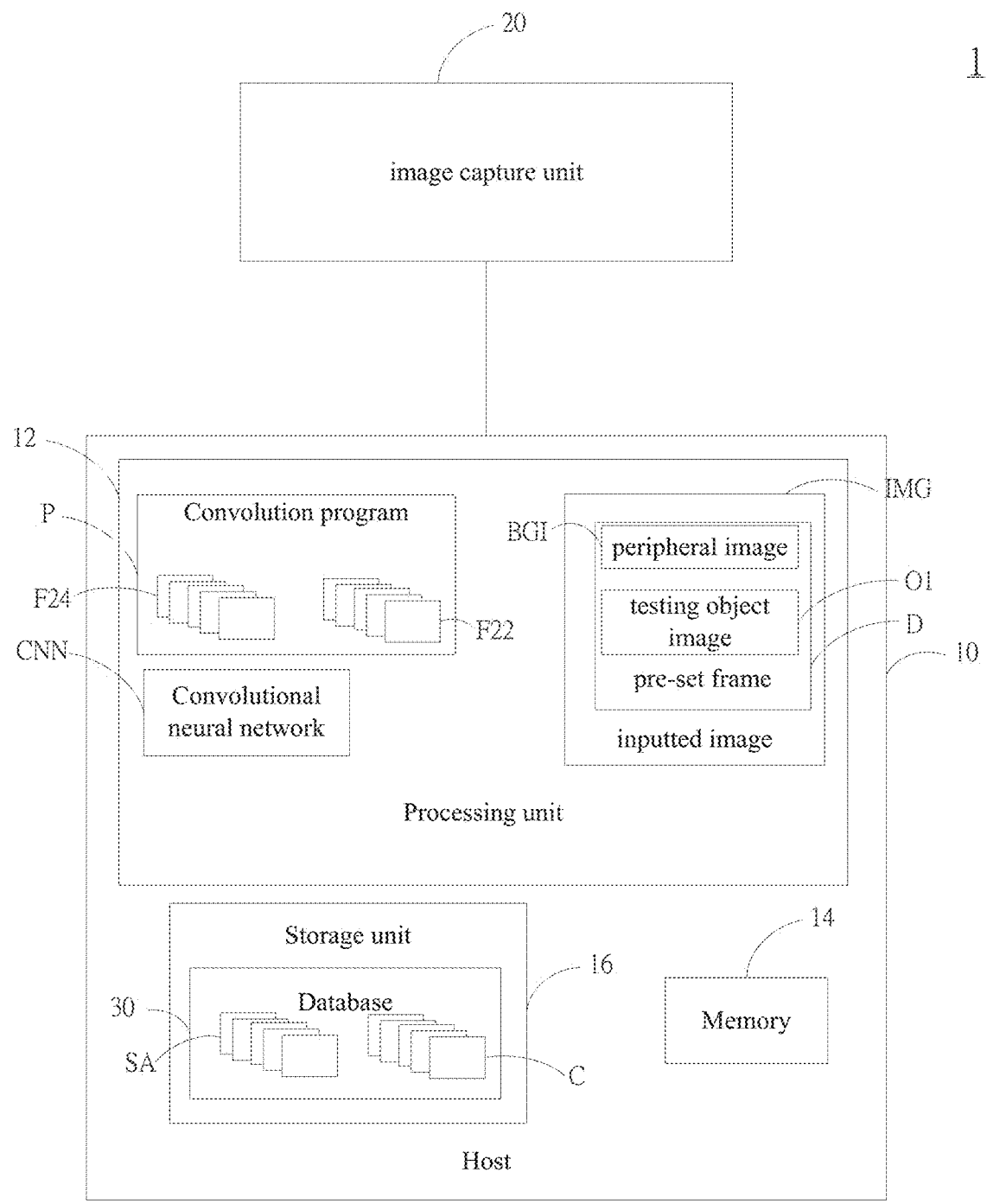
Figure 5:
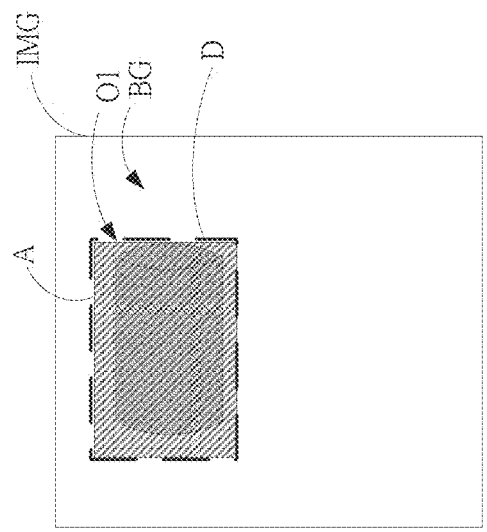
FIG. 5: which is illustrated a schematic diagram of building the pre-set frame in an embodiment of this invention.
Figure 6:
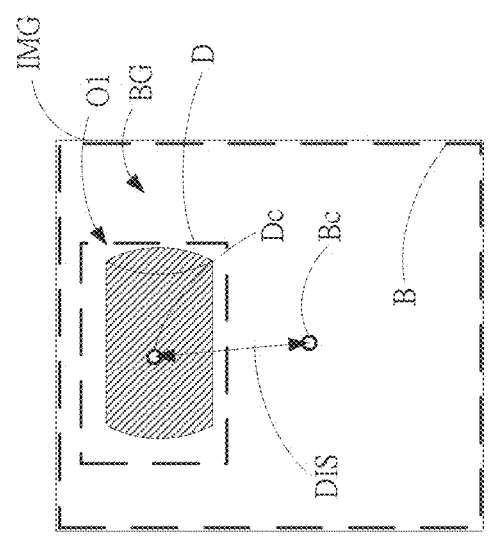
FIG. 6: which is illustrated a schematic diagram of center offset in an embodiment of this invention.

In step S30, as shown in FIG. 2D and FIG. 5, the host 10 obtains at least a selected image O2 according to the area A where the at least a testing object image O1 is located; that is, the selected eigenvalue F22 and the peripheral eigenvalues F24 obtained by the convolution program P; and the peripheral eigenvalues F24 respectively builds at least a pre-set frame D, as shown in FIG. 6. The edge relative to the inputted image IMG is the initial boundary frame B, where the side length of the pre-set frame D is min_size=$s_k$, the maximum side length is $\sqrt{\text{min\_size} \times \text{maxsize}}$, max_size=$s_{k+1}$ the side size $s_k$ is obtained following Equation (1) below:

$$s_k = s_{min} + \frac{s_{max} - s_{min}}{m-1}(k-1), k \in [1, m] \quad \text{Equation (1)}$$

From Equation (2) and Equation (3), the height and width are calculated according to the side length $s_k$:

$$h_k = s_k \sqrt{a_r} \quad \text{Equation (2)}$$

$$w_k = s_k \sqrt{a_r} \quad \text{Equation (3)}$$

The $h_k$ represents the frame height of the rectangle in the $k^{th}$ characteristic map under prior inspection, $w_k$ represents the frame width of the rectangle in the $k^{th}$ characteristic map under prior inspection, and $a_r$ represents the aspect ratio of the pre-set frame D, $a_r > 0$.

Figure 2E:
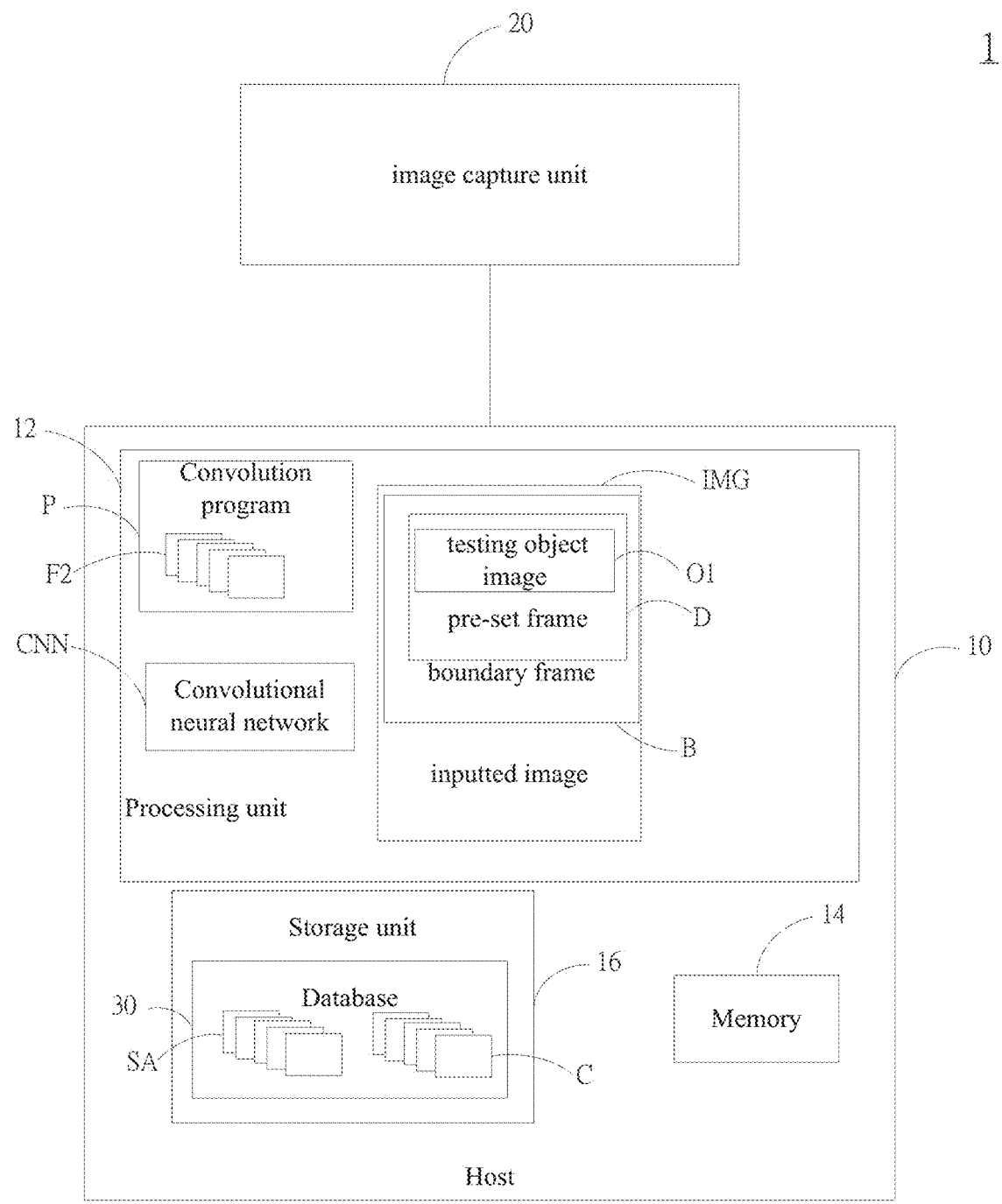
Figure 2F:
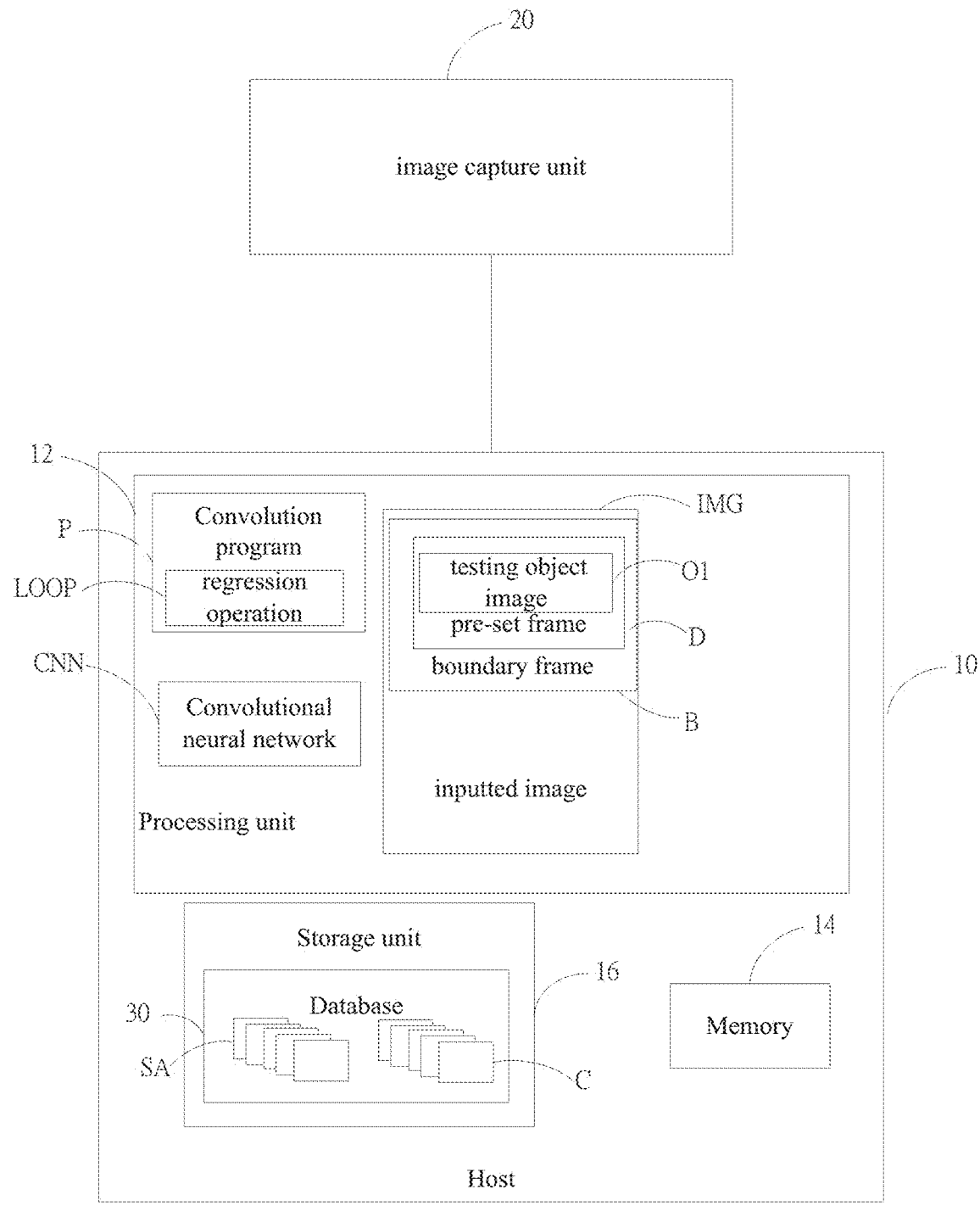
Figure 7:
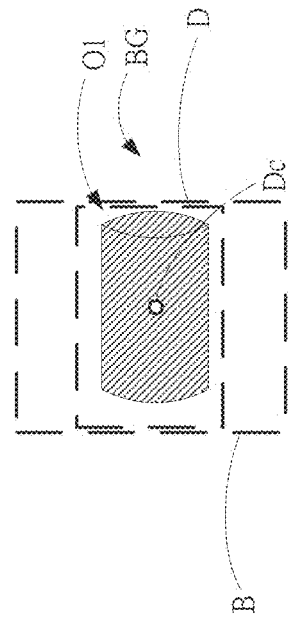
FIG. 7: which is illustrated a schematic diagram of aligning the pre-set frame and the background frame in an embodiment of this invention.

In step S40, as shown in FIG. 2F and FIG. 6, the host 10 uses the processing unit 12 to captures the boundary frame B corresponding to the inputted image IMG and runs the convolution program P, capturing a first center Dc in the pre-set frame D and a second center Bc in a boundary frame B of the inputted image IMG, and obtaining the center offset distance DIS between the first center Dc and the second center Bc. Continue to step S50, as shown in FIG. 2E and FIG. 7, the host 10 further performs regression operation LOOP by the processing unit 12 according to the center offset distance DIS between the pre-set frame D and the boundary frame B; the LOOP operation is as follows:

$$\text{Pre-set frame } D \text{ location}, d=(d^{cx}, d^{cy}, d^{w}, d^{h}) \quad \text{Equation(4)}$$

$$\text{Boundary frame } B \text{ location}, b=(b^{cx}, b^{cy}, b^{w}, b^{h}) \quad \text{Equation (5)}$$

$$\text{Zooming factor}, l=(l^{cx}, l^{cy}, l^{w}, l^{h}) \quad \text{Equation(6)}$$

$$b^{cx} = d^{w} l^{cx} + d^{cx} \quad \text{Equation(7)}$$

$$b^{cy} = d^{h} l^{cy} + d^{cy} \quad \text{Equation (8)}$$

$$b^{w} = d^{w} \exp(l^{w}) \quad \text{Equation (9)}$$

$$b^{h} = d^{h} \exp(l^{h}) \quad \text{Equation (10)}$$

First, align the center coordinates of the boundary frame B with the center coordinates of the prediction detection frame D, which means "translating" the center point of the boundary frame B to the center point of the predictive detection frame D; that is, the first center De and the second center Bc in FIG. 6 overlap, as shown in Equation (7) and Equation (8); next, "post-scale" the size of the boundary frame to be close to the pre-set frame D, as in Equation (9) and Equation (10), Through the above translation transformation and size scaling, it can make the boundary frame B infinitely close to the position of the prediction detection frame D. Therefore, in step S55, the convolutional neural network CNN of the convolution program P run by the processing unit 12 of the host 10 continuously regresses until the size of boundary frame B is infinitely close to the position of prediction detection frame D, and thereby superimposing the testing object image O1 concerning the pre-set frame D and boundary frame B, and thus accurately defining the position of the testing object image O1; that is, when the first center Dc is moved to the second center Bc, the selected images (that is, the images in the pre-set frame D) are moved to the second center Bc.

To accurately define the position of the testing object image O1, it further works with the loss equation, as showing in Equation (8) below:

$$L_{loc}(x,l,g) = \Sigma_{i \in Pos}^{N} \Sigma_{m \in \{cx,cy,w,h\}} x_{ij}^{k} \text{smooth}_{L1}(l_i^m - \hat{g}_j^m) \quad \text{Equation (8)}$$

It thus has verified the error between the locations of the pre-set predictive detection frame D and the testing object image O1.

Figure 2G:
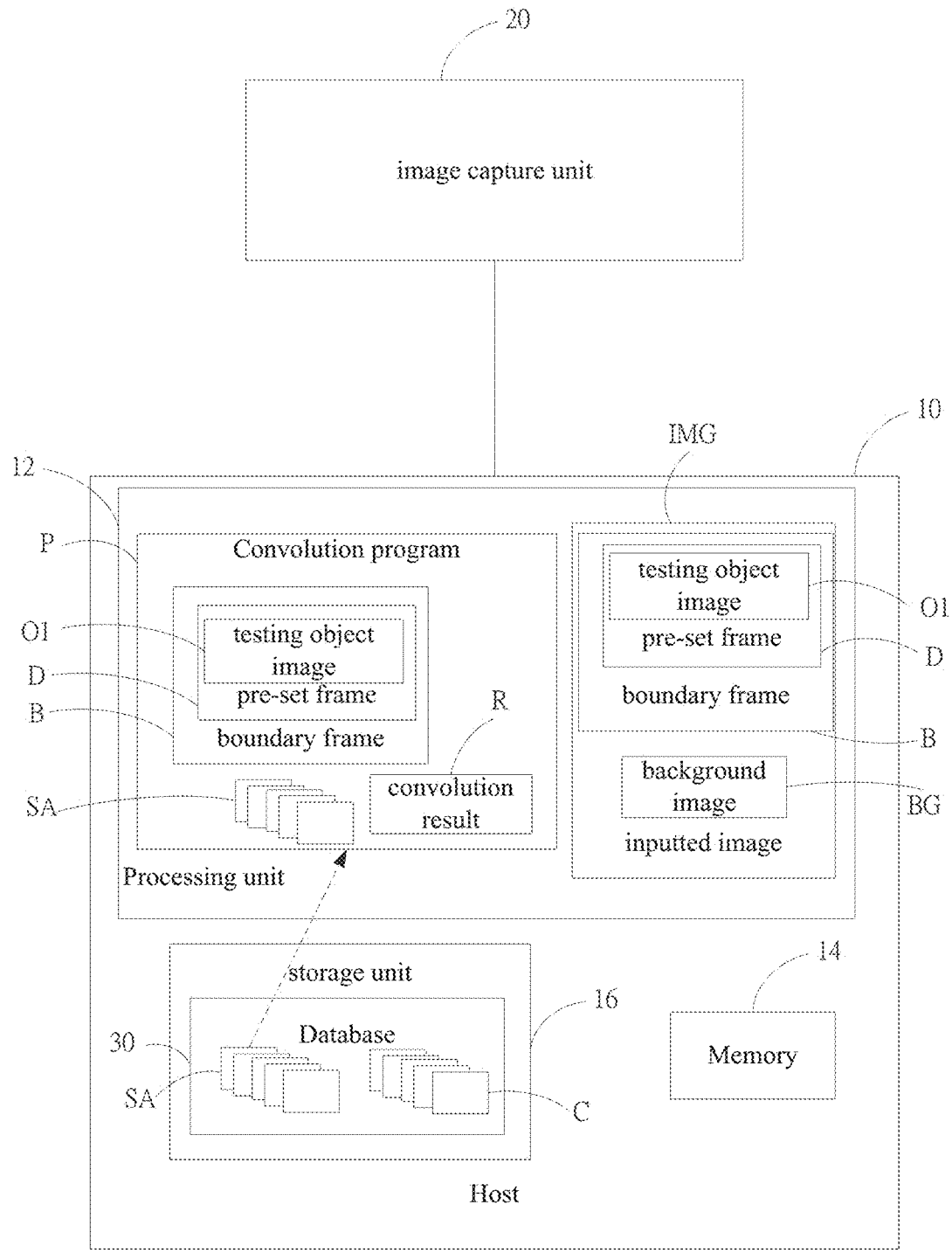
Figure 2H:
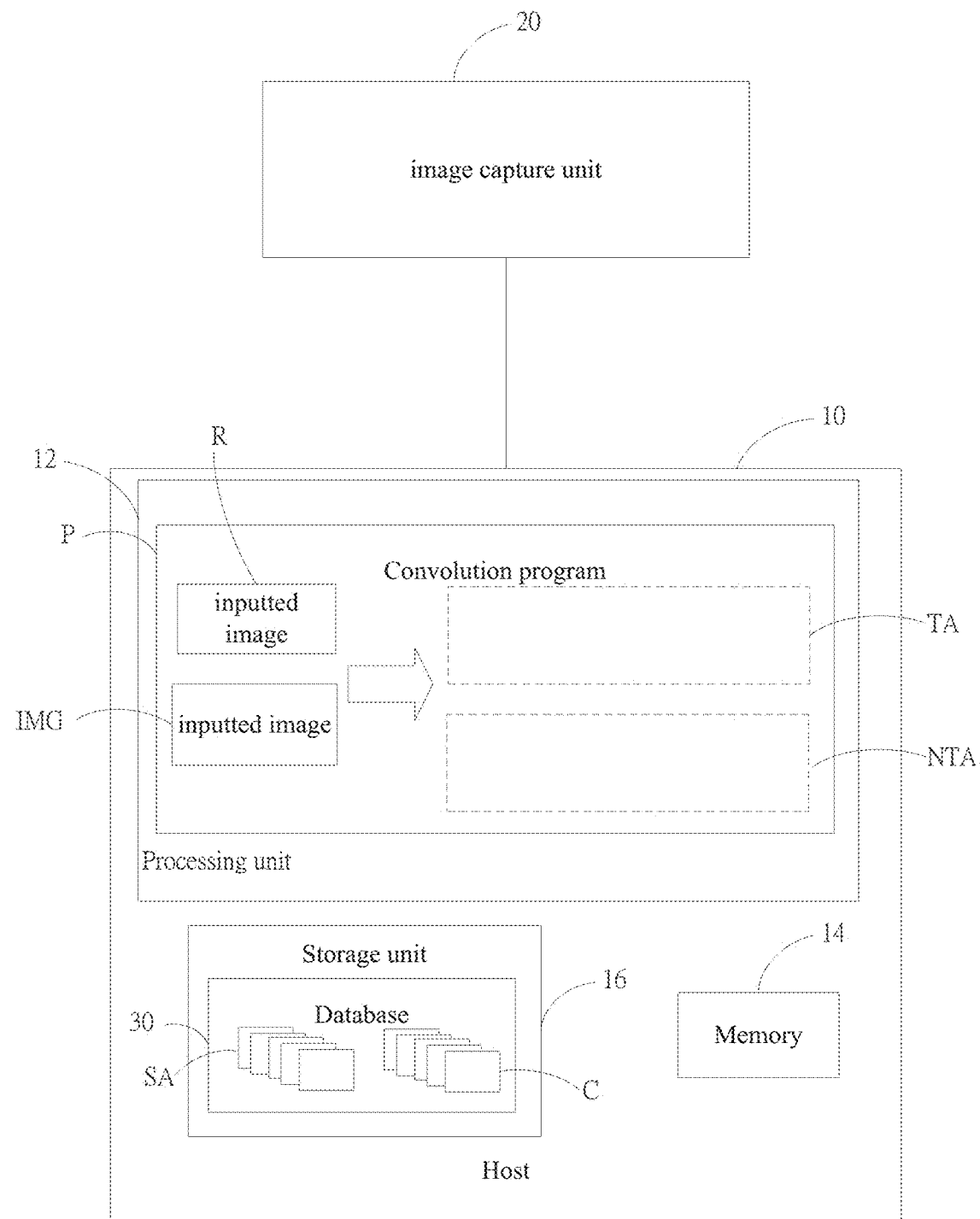

In step S60, as shown in FIG. 2G, after the processing unit 12 has positioned the location of the testing object image O1, the host 10 makes the first comparison of the testing object image O1 and the sample image SA in the database 30 and obtains a comparing result R. In the subsequent step S70, as shown in FIG. 2H, through the running of the convolution program P processed by the processing unit 12, the host 10 compares the result R and categorizes the inputted image IMG into a target object image TA or a non-target object image NTA; for example, the malignant tumor. When the convolution program P run by the processing unit 12 of the host 10 cannot recognize the testing object image O1 in the pre-set frame D matching at least a sample image SA, the host 10 categorizes the inputted image BIG into the non-target object image NTA; on the contrary, the convolution program P run by the processing unit 12 of the host 10 categorizes the inputted image IMG into the target object image TA. Furthermore, when the convolution program P run by the processing unit 12 of the host 10 categorizes the inputted image IMG into a non-target object image NTA, the convolution program P will go on running the second comparison on at least a sample image SA and the testing object image O1; if the convolution program P judges that the comparing result R of the testing object image O1 shows that the similarity of the target object image TA is greater than a similarity threshold (for example, the similarity is within 0 and 1 while taking the similarity threshold as 0.5), the convolution program P categorizes the inputted image to the target object image TA, otherwise, the convolution program P categorizes the inputted image IMG into the non-target object image NTA.

Figure 8:
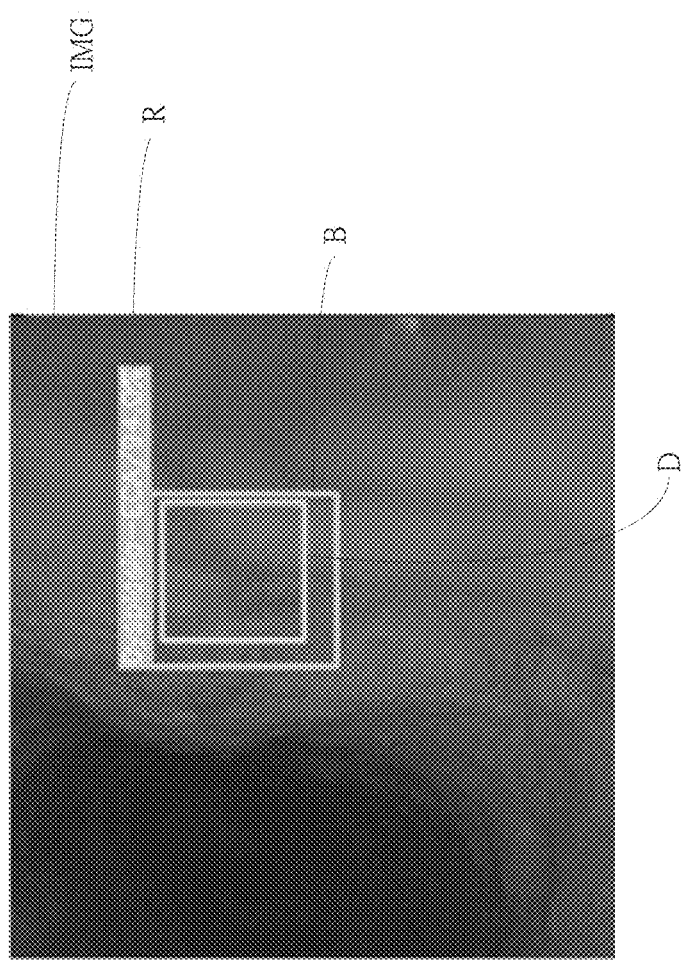
FIG. 8: which is illustrated a schematic diagram of the practical operation of this invention.

FIG. 8 is a schematic diagram of this invention in actual operation. The inputted image IMG is an esophageal endoscopic image, for the inputted image IMG that has gone through the method of detecting an object image with a hyperspectral image disclosed in this invention, the pre-set frame D and the boundary frame B are superimposed, and has been compared with the sample image with the comparison result R being obtained. The sample image is an endoscopic image of the esophagus in the dysplasia area and the accuracy rate can reach 93.0%; in addition, the image loss has dropped to 6.20. It still needs the doctor to perform other medical diagnosis methods to confirm the diagnosis. Therefore, this invention can provide the doctor with auxiliary evidence for symptom judgment.

In summary, the method for detecting object images using hyperspectral imagings disclosed in this invention provides a host to obtain hyperspectral image information, and then it converts the inputted image into a hyperspectral image according to the hyperspectral image information to continue to run the convolution program, letting the host construct a convolutional neural network to convolve the inputted image of the image capture unit, and filtering out the area to be detected. Therefore, it can set up a predictive detection frame on the inputted image, and using the regression calculation to determine the location of the testing object image using the boundary frame and compares the testing object image with the sample images, using the comparison result to categorize the target object image and the non-target object image.

What is claimed is:

1. A method for detecting images of testing object using hyperspectral imaging, comprising steps of:
   a computing device obtaining hyperspectral image information according to a reference image, the reference image including at least an object reference image and a background image;
   an image capture unit captures an inputted image and sends the inputted image to the host, the inputted image including at least a testing object image and the background image;
   the computing device converting the inputted image to obtain a hyperspectral image according to the hyperspectral image information;
   the computing device analyzing the hyperspectral image to obtain a plurality of first hyperspectral image vectors and first hyperspectral eigenvalues;
   the computing device performing a principal component analyzing process to the first hyperspectral eigenvalues to simplify the hyperspectral image and generate a plurality of corresponded second eigenvalues;
   the computing device performing at least a layer of convolution calculation on the corresponded second eigenvalues to filter out the background image and obtain a convolution result according to the plurality of convolution cores, for obtaining at least a selected image of the at least a testing object image according to the convolution result, wherein the convolution cores capture a plurality of selected eigenvalues and peripheral eigenvalues from the second eigenvalues after the filtering of the background image, the at least a testing object image includes a plurality of peripheral images and the at least a selected image, the plurality of peripheral images is adjacent to the at least a selected image, the at least a selected image corresponds to the selected eigenvalues, and the peripheral images correspond to the peripheral eigenvalues, the peripheral images surrounding the at least a selected image;
   the computing device generating at least a pre-set frame corresponding to an edge of the at least a selected image and on the inputted image according to the peripheral eigenvalues;
   the computing device generating a boundary frame on the inputted image and comparing a first center of the pre-set frame with a second center of the boundary frame to obtain a center offset between the pre-set frame and the boundary frame, wherein the boundary frame corresponds to an edge of the inputted image;
   the computing device performing a regression operation to obtain a regression operation result according to the center offset;
   the computing device aligning the testing object image according to the regression operation result and the pre-set frame wherein when the first center is moved toward the second center, the selected images are moved toward the second center;
   the computing device comparing the testing object image with at least a sample image to generate a comparing result; and
   the computing device judging if the inputted image is a target object image or not according to the comparing result.

2. The method for detecting the images of testing object using hyperspectral imaging of claim 1, in which in the step that the computing device performing the at least a layer of convolution calculation on the corresponded second eigenvalues to filter out the background image and obtain the convolution result according to the plurality of convolution cores, the computing device sets the convolution cores to m×n×p matrix and normalizes a plurality of pixel values of the inputted image to the normal pixel values, multiplies the normal pixel values by the convolution cores, and captures the second eigenvalues in a convolutional layer; where m=n, m is 1, 3, 5, 10, 19, or 38.

3. The method for detecting the images of testing object using hyperspectral imaging of claim 1, in which in the step that obtaining the at least a selected image of the at least a testing object image according to the convolution cores, the computing device obtains the entire or partial of an area where the testing object image is located according to the selected eigenvalues and obtains the at least a selected image from the second eigenvalue F2 corresponding to the inputted image.

4. The method for detecting the object images by hyperspectral image of claim 1, in which in the step that the computing device follows a plurality of convolution cores making the at least a layer of convolution calculation on the second eigenvalues, the computing device follows a single multi-frame target detector model to perform convolution on each pixel of the inputted image and detect the second eigenvalues.

5. The method for detecting the images of testing object using hyperspectral imaging of claim 1, in which in the step of the computing device performing a regression operation according to the center offset, the computing device uses a first position of the at least a pre-set frame, a second position of the boundary frame, and a zooming factor to perform the regression operation and position the at least a testing object image.

6. The method for detecting the images of testing object using hyperspectral imaging of claim 1, in which in the step that the computing device compares the testing object image with at least a sample image, the computing device performs categorization and comparison of the testing object image and the at least a same image on a fully connected layer.

7. The method for detecting the images of testing object using hyperspectral imaging of claim 1, in which in the step of determining that the inputted image is a target object image according to a comparison result, when the computing device cannot determine that the inputted image is a target object image according to the at least a sample image, the computing device follows the at least a sample image to make similarity comparison on the testing object image.

8. The method for detecting the images of testing object using hyperspectral imaging of claim 7, in which in the step that the computing device follows the at least a sample making similarity comparison on the testing object image, when the computing device judges that the similarity of the images of testing object is greater than a similarity threshold, the computing device categorizes the inputted image to the target object image, otherwise, the computing device categorizes the inputted image to the non-target object image.

9. The method for detecting the images of testing object using hyperspectral imaging of claim 1, in which the hyperspectral image information corresponds to a plurality of white light images and a plurality of narrowband images, which include a plurality of color matching functions, a correction matrix, and a conversion matrix.

10. The method for detecting the images of testing object using hyperspectral imaging of claim 1, in which in the step that the computing device follows the aligned testing object image to make the matching comparison between the testing object image and the at least a sample image, the computing device reads the at least a sample image from a database, following the aligned testing object image to perform the matching comparison with the testing object.

* * * * *